Figure 1:
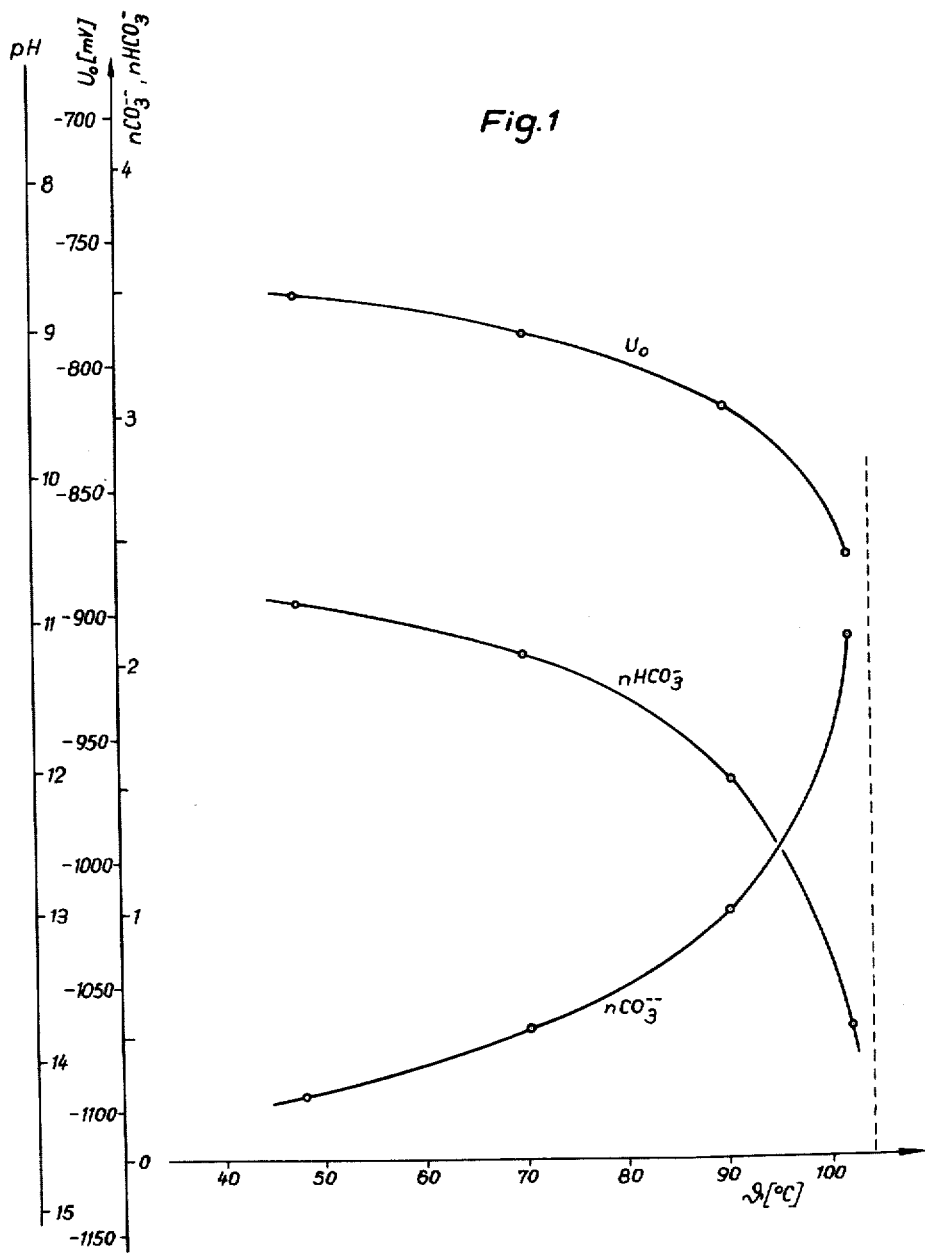

INVENTORS
GERHARD GRUNEBERG
MARGARETE JUNG
HERBERT SPENGLER

United States Patent Office 3,082,282
Patented Mar. 19, 1963

3,082,282
PROCESS FOR OPERATING FUEL CELLS
Gerhard Grüneberg, Oberhausen-Holten, Margarete Jung, Oberhausen-Sterkrade, and Herbert Spengler, Oberhausen-Holten, Germany, assignors, by mesne assignments, to Accumulatoren-Fabrik Aktiengesellschaft, Frankfurt am Main, Germany, a corporation of Germany, and Siemens-Schuckert-Werke Aktiengesellschaft, Erlangen, Germany, a corporation of Germany
Filed Jan. 13, 1959, Ser. No. 786,478
Claims priority, application Germany Jan. 18, 1958
11 Claims. (Cl. 136—86)

The present invention relates to a process for operating fuel cells in an alkaline electrolyte, and more particularly to such a process for dehydrogenation of carbon-containing fuels without consumption of the alkaline electrolyte.

In organic chemistry, a great number of reactions are known which proceed only in the presence of $OH^-$ ions of a concentration $>> 10^{-7}$ (mols/liter) and which are accelerated by the addition of metallic base catalysts, such as, for example, Raney metals or other hydrogen acceptors, such as platinum or palladium sponge etc. The activity of these catalysts increases as the $OH^-$ concentration increases.

The electrochemical conversion of carbonaceous fuels in alkaline fuel cells, which convert the chemical energy of the fuels directly into electrical energy, is preferably effected in a strongly alkaline aqueous electrolyte, such as NaOH and/or KOH and/or in an alkaline hydrolized electrolyte, such as $Na_2CO_3$ and/or $K_2CO_3$. In this process, the hydrogen which is evolved from a base-catalyzed dehydrogenation of the carbon-containing fuels accelerated by catalyst electrodes, or which is intermedially adsorbed or chemisorbed by the catalyst of the electrode, is electrochemically combusted to form water. Taking methyl alcohol as an example, the catalytic dehydrogenation reaction proceeds according to the equation $$CH_3OH + 2OH^- \rightarrow CO_3^{--} + 6H_{ads} \quad (A)$$

The subsequent electrochemical reaction proper

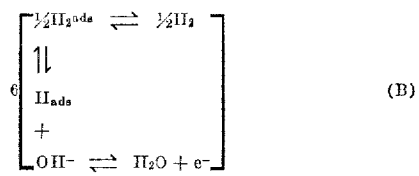

(B)

imparts to the fuel electrode the character of a hydrogen electrode, which electrochemically burns to water so much of the available hydrogen as it is capable of doing according to the anodic current. Any hydrogen which, in accordance with the preceding dehydrogenation Reaction A, is produced beyond this quantity ($H_{ads}$) recombines and desorbs or is burned to water, by molecular oxygen dissolved in the electrolyte under the cooperative action of the catalyst, without being utilized electrochemically.

As may be seen above, the dehydrogenation Reaction A consumes $OH^-$ ions and produces undesirable carbonate in addition to hydrogen. A fuel cell, which is operated with a strongly alkaline or alkaline-hydrolyzed electrolyte, therefore, will become inoperable as soon as acute $OH^-$ deficiency occurs and, in addition, by reason of the substantial reduction in conductivity of the electrolyte resulting therefrom.

It is an object of this invention to provide a process for operating fuel cells of the foregoing type with carbon-containing fuels, in which the alkaline electrolyte is not consumed during dehydrogenation.

Figure 2:
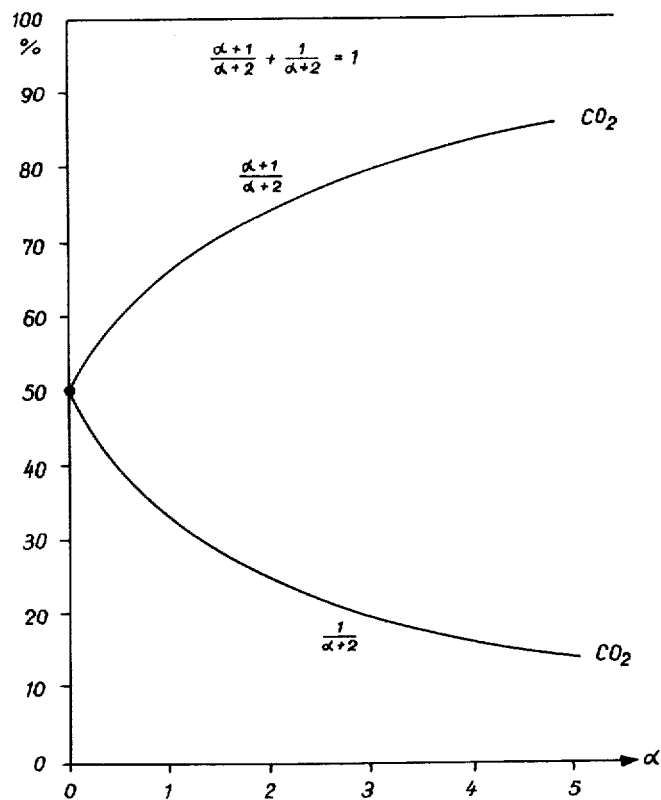
Figure 3:
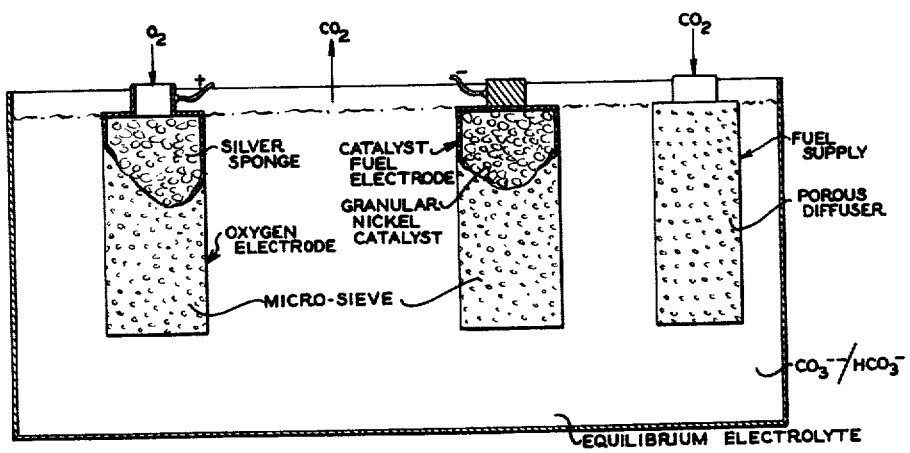
Figure 4:
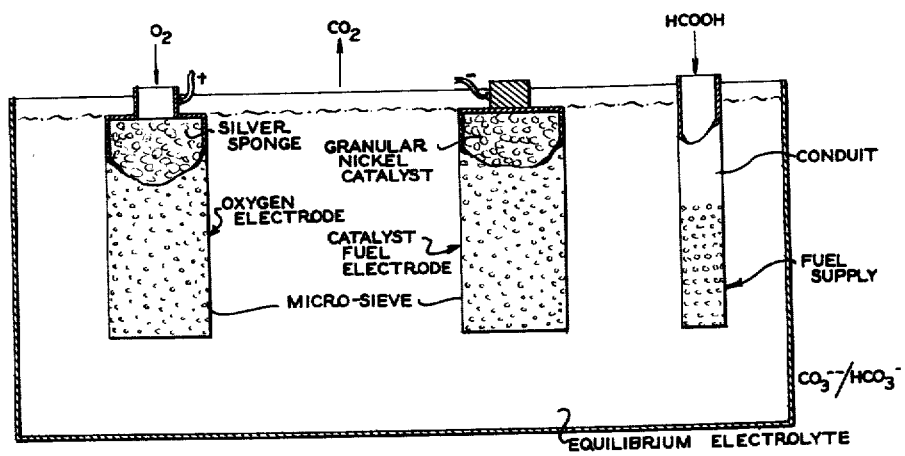

Other and further objects will become apparent from the within specification and accompanying drawings, in which FIG. 1 is a graph showing the relative concentrations of carbonate and bicarbonate and hydroxide ions as a function of the electrolyte temperature, FIG. 2 is a graph showing the ratio of the amount of carbon monoxide absorbed to the amount of carbon dioxide evolved and the amount of hydrogen evolved in the dehydrogenation to the amount of carbon dioxide evolved in a fuel cell having an alkaline electrolyte, FIG. 3 is a schematic sectional view of an apparatus for carrying out the invention which represents a carbon monoxide-converting fuel cell containing a carbonate/bicarbonate equilibrium electrolyte, and FIG. 4 is a schematic sectional view of an apparatus for carrying out the invention which represents a formic acid-converting fuel cell containing a carbonate/bicarbonate equilibrium electrolyte.

It has been found in accordance with the present invention that such fuel cells may be operated with carbon-containing fuels, in which the alkaline electrolyte is not consumed, if the alkaline hydrolyzed alkali carbonate-alkali bicarbonate electrolytes are in equilibrium at or slightly below the boiling temperature thereof at atmospheric pressure or super-atmospheric pressure. Pressures up to 50 kg./cm.² and preferaby a pressure in the range of between 1 and 5 kg./cm.² may be used, while the concentration of the alkali ions of the electrolyte or the electrolyte-fuel mixture may range from 1 to 10 [mol/liter] and preferably from 2.5 to 8 [mol/liter], and most preferably from 5 to 8 [mol/liter].

Among such carbon-containing liquid and/or gaseous fuels, which may be used in accordance with the invention, are methane, carbon monoxide, methyl alcohol, formaldehyde, formic acid or mixtures of these materials. These materials are quantitatively oxidized to carbon dioxide at the catalyst electrode used in the fuel cell. While these fuels are particularly preferred, it will be understood that any fuel can be used which exhibits the above property of being quantitatively oxidized to carbon dioxide.

An alkali carbonate-alkali bicarbonate electrolyte, after equilibrium has been established:

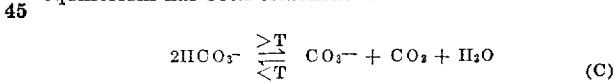

(C)

no longer absorbs carbon dioxide and retains a fixed ratio $$\alpha = \frac{[HCO_3^-]^2}{[CO_3^{--}]} \quad (D)$$

in dependence upon the temperature and the $CO_2$ partial pressure above the electrolyte.

If the temperature approaches the boiling temperature of the solution, the $HCO_3^-$ content tends to shift toward zero with formation of carbonate and simultaneous evolution of $CO_2$, while the $CO_3^{--}$ content tends to shift toward its maximum possible value. The hydrolysis of the carbonate ions is likewise subject to an equilibrium, viz.:

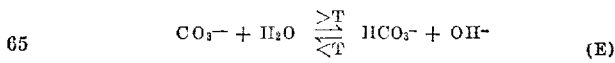

(E)

which likewise shifts towards the right side with increasing temperature. By means of a hydrogen electrode and a reference electrode, e.g. a saturated calomel electrode, the $OH^-$ concentration originating from the alkaline hydrolysis of the carbonate can be easily determined potentiometrically.

Example 1

$CO_2$ was continuously introduced into a $$K_2CO_3 - KHCO_3$$

electrolyte solution being in equilibrium, having a known $K^+$ ion concentration of about 2.5 to 2.6 [mols/liter] and communicating with the atmosphere via a reflux condenser. The composition of the electrolyte was determined by quantitative analysis, and the particular $OH^-$ concentration in dependence upon the temperature was measured potentiometrically. FIG. 1 shows the accelerated decrease in bicarbonate content and the accelerated increase in carbonate content and consequently in $OH^-$ concentration (expressed by the pH of the solution) as the boiling point of the electrolyte is approached (expressed by dotted line).

In accordance with the process of the invention, it is by means of these $OH^-$ ions, derived from the hydrolysis of the carbonate (Reaction E), that the base-catalytic dehydrogenation of liquid fuels is effected in connection with a suitable known catalyst, such as Raney nickel.

Accordingly, with the electrochemical utilization of carbon monoxide in a fuel cell operated with such an equilibrium electrolyte, as above set forth, for example, it will be seen hereafter that, although the $OH^-$ ions take part in a complete charge/discharge cycle (i.e. CO absorption by the electrolyte with formation of formate and subsequent dehydrogenation of the formate) in which as much formate is formed as is consumed by the dehydrogenation, these $OH^-$ ions are not consumed. Therefore, the electrolyte will not be consumed either. The ratio $$\alpha = \frac{[HCO_3^-]^2}{[CO_3^{--}]} \quad (F)$$

will be constant in this case, as is generally true in the stationary operation of such fuel cells.

In the case of non-catalyzed carbon monoxide absorption in the carbonate-bicarbonate equilibrium electrolyte, the following three distinct reactions proceed, which, when combined, give the overall Equation I:

$$\begin{cases} CO + OH^- \longrightarrow HCOO^- & \text{(CO absorption)} \\ CO_3^{--} + H_2O \longrightarrow HCO_3^- + OH^- & \text{(hydrolysis equilibrium)} \\ HCO_3^- \longrightarrow \tfrac{1}{2}(CO_3^{--} + CO_2 + H_2O) & \text{(carbonate-bicarbonate equilibrium)} \end{cases}$$

$$CO + \tfrac{1}{2}CO_3^{--} + \tfrac{1}{2}H_2O \longrightarrow HCOO^- + \tfrac{1}{2}CO_2 \qquad (I)$$

In the base-catalyzed dehydrogenation, accelerated, for example, by Raney nickel catalyst, of the formate formed by non-catalyzed CO absorption, the following two distinct reactions proceed, which, when combined, give the overall Equation II:

$$\begin{cases} HCOO^- + OH^- \longrightarrow CO_3^{--} + 2H_{ads} & \text{(formate dehydrogenation)} \\ CO_3^{--} + H_2O \longrightarrow HCO_3^- + OH^- & \text{(hydrolysis equilibrium)} \\ HCO_3^- \longrightarrow \tfrac{1}{2}(CO_3^{--} + CO_2 + H_2O) & \text{(carbonate-bicarbonate equilibrium)} \end{cases}$$

$$HCOO^- + \tfrac{1}{2}H_2O \longrightarrow \tfrac{1}{2}CO_3^{--} + \tfrac{1}{2}CO_2 + 2H_{ads} \qquad (II)$$

The summarized overall Equations I and II give the known shift Reaction III:

$$CO + H_2O \to CO_2 + 2H_{ads} \qquad (III)$$

The hydrogen intermedially adsorbed and chemisorbed, respectively, by the Raney catalyst in the dehydrogenation reaction ($2H_{ads}$) is then partially electrochemically combusted to form water, and partially recombined and desorbed, as stated above.

By splitting the known shift Reaction III into the two separate reactions, i.e. CO absorption by non-catalyzed formation of formate and base-catalyzed dehydrogenation of formate, the necessary cooperation and role of the $OH^-$ ions is demonstrated.

This splitting concept is in principle also true in case of the quantitative utilization of carbon monoxide in a process for generating electrical energy from carbon monoxide by indirect conversion in fuel cells operating with alkaline electrolytes, in which process the CO absorption may be effected outside of the fuel cell proper in the same alkaline solution used as the electrolyte. Of course, in dependence upon the relation $$\alpha = \frac{[HCO_3^-]^2}{[CO_3^{--}]} \quad (\geq 0) \qquad (G)$$

the ratio of the amount of CO absorbed to the amount of $CO_2$ thereby evolved is $$CO : CO_2 = 1 : \left(\frac{\alpha+1}{\alpha+2}\right) \qquad (H)$$

and the ratio of the amount of hydrogen evolved in the dehydrogenation to the amount of $CO_2$ thereby evolved is:

$$H_2 : CO_2 = 1 : \left(\frac{1}{\alpha+2}\right) \qquad (I)$$

This dependence is illustrated in FIG. 2.

It will be seen that in order to maintain high conductivity and high $OH^-$ concentration during the hydrolysis the ratio $\alpha$ should always be kept as low as possible (in the ideal case 0). This can be accomplished by reducing the $CO_2$ partial pressure in the gas space above the electrolyte by means of conventional $CO_2$-absorbing agents and/or by reducing the $CO_2$ concentration in the electrolyte by purging with a suitable gas which takes no part in the reaction, preferably nitrogen.

Example II illustrates the mode of action of a fuel cell in accordance with the invention.

Example II

A fuel cell with an alkaline hydrolized alkalicarbonate-alkalibicarbonate electrolyte being in equilibrium, was operated at temperature of ~105° C. with formate as fuel. The electrolyte contained 8 moles $K^+$ per liter, 3 moles thereof were in the form of potassium formate.

During operation the formate concentration mentioned hereinbefore was maintained by continuously introducing concentrated formic acid.

The fuel electrode for the electrochemical conversion of the liquid fuel (formate) of the cell was a catalyst sieve electrode comprising two identical microsieves made of nickel, having a total open surface area of ~30%, with circular perforations of 300μ arranged in parallel position. Arranged between the sieves was a bed of granular Raney nickel catalyst of 0.5 to 1.5 mm. particle size. The thickness of the electrode body was ~5 mm.

The electrode for the oxidizing gas ($O_2$) was a catalyst sieve electrode comprising two identical micro sieves made of silver, having a total open surface area of ~20%, perforations of ~8μ arranged in parallel position. Arranged between the sieve was a bed of silver sponge. The thickness of the electrode body was ~5 mm.

With a discharge of electricity of 15 ma./cm.² the effective voltage of the fuel cell was 0.7 v. ~85% of the theoretical charge of the fuel were used electrochemically.

The following distinct reactions proceed, which when combined give the overall equation.

Fuel electrode:

$$HCOOH \longrightarrow 2H_{ads} + CO_2 \uparrow$$
$$2(H_{ads} + OH^- \longrightarrow H_2O + e^-)$$

$O_2$-electrode:

$$\tfrac{1}{2}O_2\downarrow + H_2O + 2e^- \longrightarrow 2OH^-$$

$$\overline{HCOOH + \tfrac{1}{2}O_2 \longrightarrow CO_2 + H_2O} \qquad (IV)$$

FIG. 3 represents a conventional fuel cell arrangement having a gas diffusion oxygen electrode on the left hand side with an oxygen feed remote from the equilibrium electrolyte as well as a fuel electrode immersed within the electrolyte, said electrode being a catalyst sieve electrode having two identical micro-sieves made of nickel with a bed of granular Raney nickel catalyst material disposed between the micro-sieves. The oxygen gas diffusion electrode may be of any conventional type, such as one having silver catalyst material disposed thereon in the well known manner. The fuel supply (in this case, carbon monoxide) is by way of a conduit located at the right side of the fuel cell such that the gas diffuses through a microporous element into the equilibrium electrolyte. The oxygen electrode and fuel electrode are connected by an outside circuit for an electrical energy route in the usual manner. The over-all reaction of the cell is as follows:

$$CO + \tfrac{1}{2}O_2 \rightarrow CO_2$$

Specifically, carbon monoxide absorption takes place at the right side of the fuel cell while oxygen reacts with water and two electrons to form two hydroxyl ions at the oxygen electrode on the left side of the fuel cell. At the fuel electrode, the hydroxyl ions formed at the oxygen electrode are combined with the formate formed as a result of the carbon monoxide absorption to produce catalytically adsorbed hydrogen and carbonate ions. In turn, after this catalytic dehydrogenation reaction, the adsorbed hydrogen and additional hydroxyl ions are electrochemically combusted to form water, giving off electrons to the fuel electrode. To complete the cycle, of course, two electrons flow through the outside circuit to the oxygen electrode whereat the same are included in the water and oxygen reaction to form hydroxyl ions at the oxygen electrode. In accordance with the over-all reaction, carbon dioxide is liberated from the electrolyte, while oxygen and carbon monoxide are consumed so that electrical energy will be produced in an electrochemical manner.

With respect to FIG. 4, the same fuel cell arrangement is provided as that shown in FIG. 3, except that the liquid formate rather than the gaseous carbon monoxide is employed as fuel. Thus, a series of openings in the fuel conduit may be provided on the right side of the fuel electrode for feeding the fuel into the electrolyte. It will be appreciated that in this instance as well, the same reactions occur except that the formic acid combines with hydroxyl ions to produce formate and water. On the other hand, where carbon monoxide is used as fuel, the carbon monoxide combines with hydroxyl ions to form formate without the simultaneous formation of water. Therefore, in the over-all reaction, the only difference is that water will be liberated in addition to carbon dioxide when formic acid and oxygen are electrochemically combusted to produce electrical energy. The over-all reaction of the cell is, therefore, as follows:

$$HCOOH + \tfrac{1}{2}O_2 \rightarrow CO_2 + H_2O$$

What is claimed is:
1. A process for operating fuel cells containing an alkaline-hydrolyzed alkali carbonate-alkali bicarbonate electrolyte and having a fuel catalyst electrode for the generation of electrical energy, which comprises quantitatively oxidizing a fluid carbon-containing fuel selected from the group consisting of methane, carbon monoxide, methyl alcohol, formaldehyde, formic acid, and mixtures thereof to carbon dioxide at the fuel electrode of the fuel cell while maintaining the carbonate and bicarbonate content of the electrolyte substantially in equilibrium at a temperature from slightly below the boiling temperature and at least above about 90 degrees C. up to the boiling temperature of the electrolyte and at a pressure at least substantially as high as atmospheric pressure, and maintaining the concentration of the alkali ions present within the range of substantially from 1 to 10 mols per liter, the alkali ions used being selected from the group consisting of potassium and sodium ions.

2. A process according to claim 1, wherein pressures up to about 50 kg./cm.$_2$ are used.

3. A process according to claim 1, wherein the pressure is in the range from about 1 to 5 kg./cm.$^2$.

4. A process according to claim 1, wherein the concentration of alkali ions present is maintained within the range of from about 2.5 to 8 mols per liter.

5. A process according to claim 1, wherein the concentration of alkali ions present is maintained within the range of from about 5 to 8 mols per liter.

6. A process according to claim 1, wherein the fuel electrode contains Raney nickel as catalyst.

7. A process according to claim 1, wherein the partial pressure in the gas space above the electrolyte in the fuel cell caused by the formation of carbon dioxide is reduced by absorption of said carbon dioxide by a carbon dioxide absorbing agent maintained in said gas space.

8. A process according to claim 1, wherein the carbon-dioxide concentration in the electrolyte is reduced by purging said electrolyte with a gas inert to the reaction.

9. A process according to claim 1, wherein at least a portion of the carbon dioxide present in the fuel cell is constantly removed.

10. A process for operating a fuel cell having a porous fuel catalyst electrode with internal pores containing catalyst material for the electrical generation of energy, which comprises quantitatively oxidizing a fluid carbon-containing fuel selected from the group consisting of methane, carbon monoxide, methyl alcohol, formaldehyde, formic acid, and mixtures thereof to carbon dioxide at the fuel catalyst electrode of said cell in the presence of an alkaline-hydrolyzed alkali carbonate-alkali bicarbonate electrolyte without any substantial consumption of the electrolyte by passing said fuel into contact with said electrolyte and catalytically dehydrogenating the resulting ions on the fuel electrode, whereby the hydrogen evolved in the dehydrogenation is converted electrochemically, while maintaining the carbonate and bicarbonate content of the electrolyte substantially in equilibrium at a temperature from slightly below the boiling temperature and at least above 95 degrees C. up to the boiling temperature of the electrolyte and at least at a pressure substantially as high as atmospheric pressure, and maintaining the alkali ion concentration within the range of substantially from 1 to 10 mols per liter, the alkali ions used being selected from the group consisting of potassium and sodium ions.

11. In the process for the indirect production of electrical energy from fluid fuels convertible to carbon dioxide in a liquid electrolyte in a fuel cell having a porous double skeleton catalyst fuel electrode, the improvement which comprises quantitatively oxidizing a fluid carbon-containing fuel selected from the group consisting of methane, carbon monoxide, methyl alcohol, formaldehyde, formic acid, and mixtures thereof to carbon dioxide at the fuel electrode in the presence of an alkaline-hydrolyzed alkali carbonate-alkali bicarbonate electrolyte without any substantial consumption of the electrolyte by maintaining the carbonate and bicarbonate content of the electrolyte substantially in equilibrium at a temperature from slightly below the boiling temperature and at least above 95 degrees C. up to the boiling temperature of the electrolyte and at least at a pressure substantially as high as atmospheric pressure, and maintaining the alkali ion concentration within the range of substantially from 1 to 10 mols per liter, the alkali ions used being selected from the group consisting of potassium and sodium ions.

References Cited in the file of this patent
UNITED STATES PATENTS
2,925,454    Justi _____ Feb. 16, 1960

UNITED STATES PATENT OFFICE
CERTIFICATE OF CORRECTION

Patent No. 3,082,282                         March 19, 1963

Gerhard Grüneberg et al.

It is hereby certified that error appears in the above numbered patent requiring correction and that the said Letters Patent should read as corrected below.

In the drawings, Sheet 3, Figure 3, at the top right corner of the figure, for "$CO_2$" read -- CO --; column 3, line 30, for "mormate" read -- formate --; line 45, after "$H_2O$" insert a closing parenthesis.

Signed and sealed this 1st day of October 1963.

(SEAL)
Attest:

ERNEST W. SWIDER                             DAVID L. LADD
Attesting Officer                                Commissioner of Patents